US010981270B1

(12) United States Patent
Pastor Sampedro et al.

(10) Patent No.: US 10,981,270 B1
(45) Date of Patent: *Apr. 20, 2021

(54) OPERATING MULTIPLE TESTING ROBOTS BASED ON ROBOT INSTRUCTIONS AND/OR ENVIRONMENTAL PARAMETERS RECEIVED IN A REQUEST

(71) Applicant: X Development LLC, Mountain View, CA (US)

(72) Inventors: Peter Pastor Sampedro, Oakland, CA (US); Mrinal Kalakrishnan, Mountain View, CA (US); Ali Yahya Valdovinos, Palo Alto, CA (US); Adrian Li, San Francisco, CA (US); Kurt Konolige, Menlo Park, CA (US); Vincent Dureau, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,711

(22) Filed: Aug. 2, 2019

Related U.S. Application Data

(63) Continuation of application No. 16/051,638, filed on Aug. 1, 2018, now Pat. No. 10,427,296, which is a continuation of application No. 15/205,760, filed on Jul. 8, 2016, now Pat. No. 10,058,995.

(51) Int. Cl.
*B25J 9/00* (2006.01)
*B25J 9/16* (2006.01)

(52) U.S. Cl.
CPC ............. *B25J 9/0084* (2013.01); *B25J 9/163* (2013.01)

(58) Field of Classification Search
CPC ................................. B25J 9/0084; B25J 9/163
USPC .................................................. 700/245, 248
See application file for complete search history.

(56) References Cited

U.S. PATENT DOCUMENTS

| 7,343,222 | B2 | 3/2008 | Solomon |
| 8,078,357 | B1 | 12/2011 | Trytten et al. |
| 8,484,146 | B2* | 7/2013 | Movellan ............... B25J 13/003 |
| | | | 706/45 |
| 8,615,374 | B1 | 12/2013 | Discenzo |
| 9,043,031 | B1 | 5/2015 | Gardner et al. |
| 9,195,233 | B2 | 11/2015 | Perrone |
| 9,310,800 | B1 | 4/2016 | Datcher et al. |

(Continued)

OTHER PUBLICATIONS

Laue, T. et al. "SimRobot—A General Physical Robot Simulator and its Application in Robocup." In Robot Soccer World Cup, pp. 173-183. Springer Berlin Heidelberg, 2005.

(Continued)

*Primary Examiner* — Jaime Figueroa
(74) *Attorney, Agent, or Firm* — Middleton Reutlinger

(57) ABSTRACT

Methods and apparatus related to receiving a request that includes robot instructions and/or environmental parameters, operating each of a plurality of robots based on the robot instructions and/or in an environment configured based on the environmental parameters, and storing data generated by the robots during the operating. In some implementations, at least part of the stored data that is generated by the robots is provided in response to the request and/or additional data that is generated based on the stored data is provided in response to the request.

16 Claims, 7 Drawing Sheets

(56) References Cited

U.S. PATENT DOCUMENTS

| | | | |
|---|---|---|---|
| 9,613,310 B2 | 4/2017 | Buibas et al. | |
| 9,811,074 B1* | 11/2017 | Aichele | G06N 7/04 |
| 2004/0162638 A1 | 8/2004 | Solomon | |
| 2007/0185825 A1* | 8/2007 | Ito | G06N 20/00 |
| | | | 706/30 |
| 2007/0208442 A1 | 9/2007 | Perrone | |
| 2012/0109864 A1 | 5/2012 | Modha | |
| 2013/0345872 A1* | 12/2013 | Brooks | B25J 9/1682 |
| | | | 700/259 |
| 2014/0089232 A1 | 3/2014 | Buibas et al. | |
| 2014/0122391 A1* | 5/2014 | Mugan | G06N 5/025 |
| | | | 706/12 |
| 2014/0288714 A1 | 9/2014 | Poivet | |
| 2015/0037775 A1 | 2/2015 | Ottensmeyer et al. | |
| 2015/0127150 A1* | 5/2015 | Ponulak | G05D 1/0088 |
| | | | 700/250 |
| 2015/0290795 A1 | 10/2015 | Oleynik | |
| 2015/0339589 A1* | 11/2015 | Fisher | G06K 9/00805 |
| | | | 706/12 |
| 2016/0059412 A1 | 3/2016 | Oleynik | |
| 2016/0221186 A1 | 8/2016 | Perrone | |
| 2016/0357525 A1* | 12/2016 | Wee | G06F 9/455 |
| 2017/0028563 A1* | 2/2017 | Hemken | B25J 19/023 |
| 2017/0252922 A1 | 9/2017 | Levine et al. | |
| 2017/0334066 A1 | 11/2017 | Levine et al. | |

OTHER PUBLICATIONS

Argall, B. et al. "A survey of robot learning from demonstration." Robotics and Autonomous Systems 57, No. 5 (2009): 469-483.

Levine, Sergey, et al. "Learning hand-eye coordination for robotic grasping with large-scale data collection." International Symposium on Experimental Robotics. Springer, Cham, 11 pages. Mar. 7, 2016.

Finn, Chelsea, et al. "Unsupervised learning for physical interaction through video prediction." Advances in neural information processing systems. 12 pages. May 23, 2016.

* cited by examiner

OPERATING MULTIPLE TESTING ROBOTS BASED ON ROBOT INSTRUCTIONS AND/OR ENVIRONMENTAL PARAMETERS RECEIVED IN A REQUEST

BACKGROUND

Robots can be configured to perform a variety of functions. For example, a robot can be configured to utilize one or more end effectors to grasp objects, open doors, clean a surface, etc. Various techniques may be utilized to configure robots. As one example, humans may utilize various programming environments (e.g., text based, graphical based) to create source code that dictates at least some operations of a robot. The source code can be compiled into object code, which may be executed by one or more processors of the robot to control one or more operations of the robot. As another example, neural network models can be trained based on training data and utilized in the control of one or more operations of the robot.

SUMMARY

Implementations of this specification are directed generally to methods and apparatus related to receiving a request that includes robot instructions and/or environmental parameters, operating each of a plurality of robots based on the robot instructions and/or in an environment configured based on the environmental parameters, and storing data generated by the robots during the operating. As described in more detail herein, the robot instructions of a request specify at least part of operation of a robot and may take various forms such as source code, object code, and/or other instructions that may be executed by a robot (optionally after compiling or other processing).

In some implementations, information based on the stored data generated by the testing robots is provided in response to the request. The information based on the stored data can be at least part of the stored data that is generated by the testing robots and/or additional data that is generated based on the stored data. The data generated by a testing robot may include, for example, sensor data from one or more sensors of the robot (e.g., video/images from vision sensors, force measures from force sensors, position measures from position sensors, measures from tactile sensors) and/or data that indicates error condition(s) encountered during operation of the robot (e.g., due to erroneous robot instructions, due to robot instructions causing operational and/or safety limits to be exceeded).

In implementations where additional data generated based on the stored data is provided in response to the request (in addition to or instead of the stored data), various types of additional data may be provided. For example, the additional data may include an analysis of the robot instructions based on the stored data (e.g., a success rate of a robot task implemented via the robot instructions), a modification of the robot instructions determined based on the stored data, and/or training examples generated based on the stored data. As another example, in some implementations a neural network model may be provided in a request along with the robot instructions, training examples generated based on the stored data, the neural network model trained based on the training examples, and the additional data may include the neural network model as updated based on the training.

In various implementations, one or more of the plurality of testing robots include one or more hardware components that are different from, configured differently from, and/or that have different wear characteristics than hardware components of other testing robots. In various implementations, one or more of the plurality of testing robots additionally and/or alternatively include one or more software components (e.g., drivers, operating system) that are different from and/or configured differently from those of other testing robots. Further, in various implementations different testing robots may interact with different environmental objects and/or different configurations of those environmental objects; may include different non-interacted with objects in their operating space; and/or may include different environmental conditions in their operating space. Moreover, in various implementations the environmental objects interacted with by a given testing robot, other objects in the operating space of the given testing robot, and/or environmental conditions in the operating space may be varied during the course of operation of the given testing robot based on the robot instructions of a given request. In one or more of the preceding implementations, variability among hardware components, software components, and/or environmental parameters of multiple testing robots may provide diversity in the data generated by the testing robots based on robot instructions received in a request and/or diversity and/or robustness in the additional data generated based on that data.

In some implementations, a method is provided that includes receiving, by one or more processors via one or more network interfaces, a request that includes robot instructions and environmental parameters. The robot instructions specify at least part of operation of the robot. The environmental parameters indicate one or more properties of environmental objects that are external to the robot and that are to be interacted with by the robot during operation of the robot based on the robot instructions. The method further includes: for each of a plurality of given robots, configuring an operating space of the given robot based on the environmental parameters so that at least one environmental object having at least one of the properties is present in an operating space of the robot; operating each of the given robots based on the robot instructions after configuring the operating space based on the environmental parameters; storing, by one or more of the processors in one or more computer readable media, data generated by the given robots during the operation of the given robots based on the robot instructions; and providing, in response to the request and by one or more of the processors via one or more of the network interfaces, information based on the data.

This method and other implementations of technology disclosed herein may each optionally include one or more of the following features.

In some implementations, the properties indicated by the environmental parameters include one or more pose constraints for the environmental objects. In some of those implementations, configuring the operating space of the given robot based on the environmental parameters includes positioning the environmental object in the operating space based on at least one of the pose constraints.

In some implementations, the properties indicated by the environmental parameters include a class having a plurality of the environmental objects as members. In some of those implementations, configuring the operating space of the given robot based on the environmental parameters includes selecting the environmental object based on the environmental object being a member of the class.

In some implementations, configuring the operating space of the given robot based on the environmental parameters is performed by the given robot or by one or more additional robots.

In some implementations, the robot instructions include object code that is executable by the one or more processors of the robot.

In some implementations, the robot instructions include source code and a compilation of the source code is executable by the one or more processors of the robot.

In some implementations, the robot instructions include a machine learning model. In some of those implementations, operating the given robot of the given robots based on the robot instructions includes: applying input to the machine learning model, generating an output over the machine learning model based on the input, and using the output in operating the given robot.

In some implementations, the data includes sensor data generated by sensors of the given robots. In some of those implementations, the method further includes: receiving a machine learning model, generating training examples based on the sensor data and based on input parameters and output parameters of the machine learning model, and training the machine learning model based on the training examples to generate an updated machine learning model. Providing information based on the data may include providing the updated machine learning model as at least some of the information based on the data.

In some implementations, the data includes sensor data generated by sensors of the testing robots and the method further includes generating training examples based on the sensor data and based on input parameters and output parameters of a machine learning model. Providing information based on the data may include providing the training examples as at least some of the information based on the data.

In some implementations, the method further includes: configuring a simulated operating space of a robot simulator based on the environmental parameters; operating the robot simulator based on the robot instructions with the simulated operating space configured based on the environmental parameters; and storing, by one or more of the processors in one or more of the computer readable media, simulated data generated by the robot simulator during the operation of the robot simulator based on the robot instructions. The information may be further based on the simulated data. For example, at least some of the information may include at least some of the simulated data and/or additional data that is based on the simulated data and/or the data.

In some implementations, a method is provided that includes: receiving user interface input generated via a user interface input device of a client computing device; and generating, based on the user interface input, a request that includes robot instructions and environmental parameters. The robot instructions specify at least part of operation of the robot. The environmental parameters indicate one or more properties of environmental objects that are external to the robot and that are to be interacted with by the robot during operation of the robot based on the robot instructions. The method further includes: transmitting the request via one or more network interfaces of the client computing device; and receiving, by the client computing device or an additional computing device in response to the request: sensor data generated by sensors of a plurality of robots each operated based on the robot instructions of the request in an operating environment configured based on the environmental parameters of the request, and/or additional data generated based on the sensor data.

This method and other implementations of technology disclosed herein may each optionally include one or more of the following features.

In some implementations, the receiving includes receiving the additional data generated based on the sensor data. In some of those implementations, the request further includes a machine learning model, the additional data comprises an updated machine learning model, and the updated machine learning model is updated based on training of the machine learning model based on training examples generated based on the sensor data.

In some implementations, a method is provided that includes receiving, by one or more processors via one or more network interfaces, a request that includes robot instructions and a machine learning model. The robot instructions in combination with the machine learning model specify at least part of operation of the robot. The method further includes: operating each of a plurality of given robots based on the robot instructions and the machine learning model; storing, by one or more of the processors in one or more computer readable media, sensor data generated by the given robots during the operation of the given robots based on the robot instructions and the machine learning model; generating training examples for the machine learning model based on the sensor data generated by the given robots during the operation of the given robots based on the robot instructions and the machine learning model; and training the machine learning model based on the training examples to create an updated machine learning model.

This method and other implementations of technology disclosed herein may each optionally include one or more of the following features.

In some implementations, the request further includes environmental parameters, and the method further includes: for each of the given robots prior to operating the given robots based on the robot instructions and the machine learning model, configuring an operating space of the given robot based on the environmental parameters. In some versions of those implementations, the environmental parameters indicate one or more pose constraints for the environmental objects and configuring the operating space of the given robot based on the environmental parameters includes: positioning the environmental object in the operating space based on at least one of the pose constraints. In some versions of those implementations, the environmental parameters indicate a class having a plurality of the environmental objects as members and configuring the operating space of the given robot based on the environmental parameters includes: selecting the environmental object based on the environmental object being a member of the class.

In some implementations, the method further includes: operating a robot simulator based on the robot instructions and the machine learning model; storing, by one or more of the processors in one or more of the computer readable media, simulated sensor data generated by the robot simulator during the operation of the robot simulator; generating initial training examples for the machine learning model based on the simulated sensor data; and training the machine learning model based on the initial training examples to create an initial updated machine learning model. In some of those implementations, operating the plurality of given robots based on the robot instructions and the machine learning model includes operating one or more of the given robots based on the initial updated machine learning model.

In some implementations, the method further includes providing the updated machine learning model in response to the request.

In some implementations, the method further includes: operating one or more of the given robots or additional given robots based on the robot instructions and the updated machine learning model; storing, by one or more of the processors in one or more computer readable media, additional sensor data generated during the operation based on the robot instructions and the updated machine learning model; generating additional training examples for the machine learning model based on the sensor data generated during the operation based on the robot instructions and the updated machine learning model; and training the updated machine learning model based on the training examples to create a further updated machine learning model.

Other implementations may include a non-transitory computer readable storage medium storing instructions executable by one or more processors (e.g., central processing unit(s) (CPU(s)) or graphics processing unit(s) (GPU(s))) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
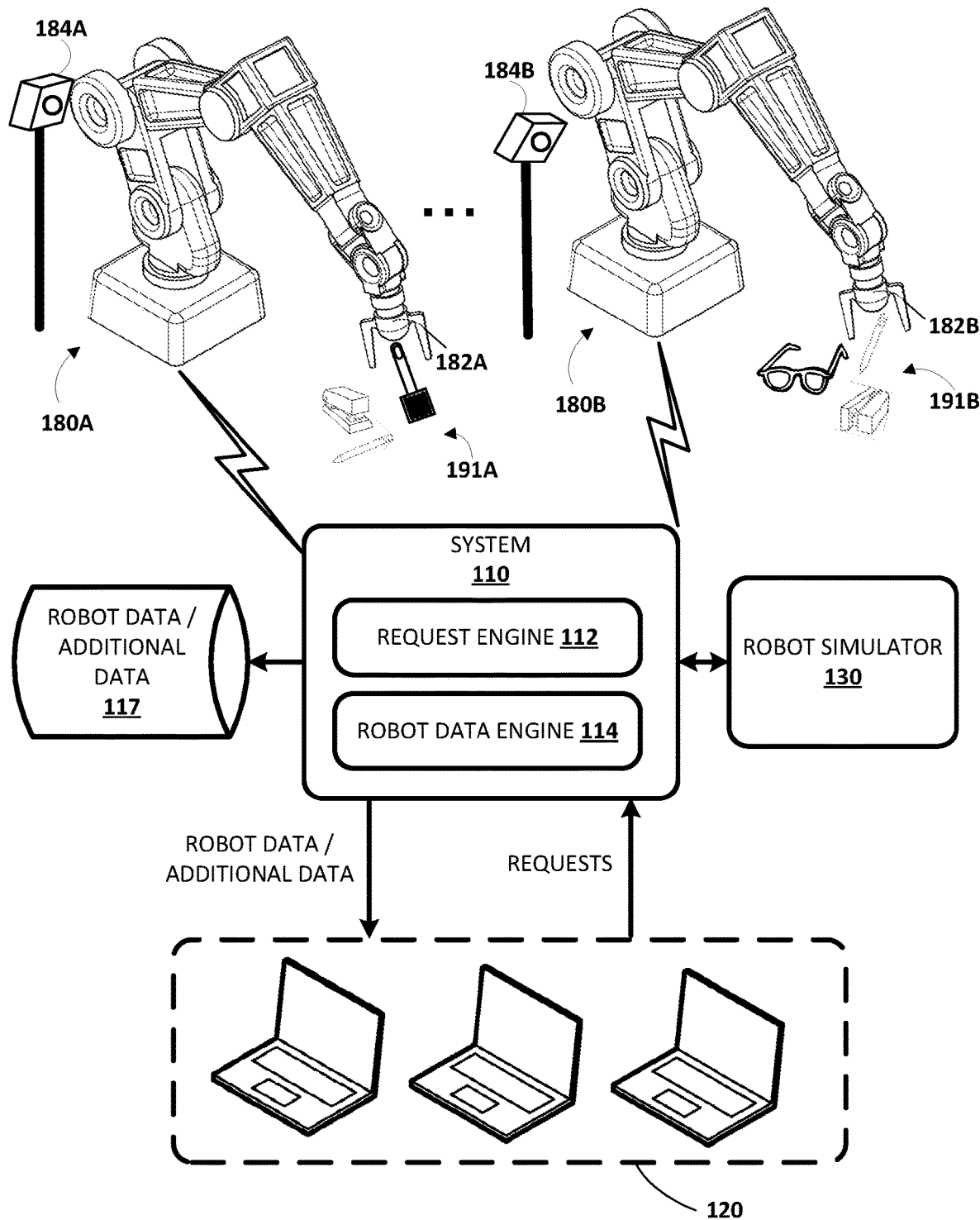
FIG. 1 illustrates an example environment in which implementations disclosed herein may be implemented.

Some implementations of the technology described herein are directed to receiving a request that includes robot instructions and/or environmental parameters, operating each of a plurality of testing robots based on the robot instructions and/or in an environment configured based on the environmental parameters, and storing data generated by the testing robots during the operating. In some implementations, information based on the stored data is provided in response to the request. The information based on the stored data may include at least part of the stored data that is generated by the testing robots and/or additional data that is generated based on the stored data.

In implementations where the stored data is provided in response to the request, it may be utilized for various purposes such as analysis of performance of the robot instructions (e.g., to determine error conditions, success rate of a task implemented by the robot instructions, and/or performance issues), modification of the robot instructions, and/or to generate training examples for training of a neural network model. The generated data may include, for example, sensor data from one or more sensors of the robot (e.g., video/images from vision sensors, force measures from force sensors, position measures from position sensors, measures from tactile sensors), and/or data that indicates error condition(s) encountered during operation of the robot (e.g., due to erroneous robot instructions, due to robot instructions causing operational and/or safety limits to be exceeded).

In implementations where additional data generated based on the stored data is provided in response to the request (in addition to or instead of the stored data), various types of additional data may be provided. For example, the additional data may include an analysis of the robot instructions based on the stored data, a modification of the robot instructions determined based on the stored data, and/or training examples generated based on the stored data. For instance, the additional data may include a success rate of a task implemented by the robot instructions such as a rate of successful grasp for a grasping task. A rate of successful grasp may be determined, for example, based on sensor data from force sensor(s) of a grasping end effector following a grasp attempt and/or analysis of images captured following a grasp attempt. Also, for example, the robot instructions may be provided with a neural network model, training examples generated based on the stored data, the neural network model trained based on the training examples, and the additional data may include the neural network model as updated based on the training. For instance, the robot instructions may include instructions for utilizing the trained neural network model in the operation of the testing robots (e.g., instructions that define the input parameters of the model and how the output of the model is utilized to control the operation of the testing robots)—and data from operating the testing robots based on the neural network model used to generate training examples to update the neural network model. Also, for instance, the robot instructions may include instructions for operating the robot, without utilization of the model, to generate training examples for the model, and data from operating the robot based on the robot instructions may be used to initially train and/or update the neural network model.

In various implementations, one or more of the plurality of testing robots include one or more hardware components that are different from, configured differently from, and/or that have different wear characteristics than hardware components of other testing robots. For example, a first testing robot may have an associated vision sensor with a pose relative to a reference frame of the testing robot that is unique from the pose of one or more vision sensors associated with other of the robots. Also, for example, a first testing robot may have an end effector than is different from and/or that has worn differently than an end effector of another testing robot. In various implementations, one or more of the plurality of testing robots additionally or alternatively include one or more software components (e.g., drivers, operating system) that are different from and/or configured differently from those of other testing robots. In some of those implementations, variability among hardware and/or software components may provide diversity in the data generated by the testing robots based on robot instructions and/or diversity and/or robustness in the additional data generated based on that data.

Further, in various implementations different testing robots may interact with different environmental objects and/or different configurations of those environmental objects. For example, objects of different sizes, different weights, different shapes, different translucencies, and/or different materials may be interacted with by different robots—where each of the different objects and/or configurations still correspond to the environmental parameters. Still further, different testing robots may include different non-interacted with objects in their operating space (e.g., different surfaces, different environmental obstacles) and/or different environmental conditions in their operating space (e.g., different lighting, different temperatures). Moreover, in various implementations the environmental objects interacted with by a given testing robot, other objects in the operating space of the given testing robot, and/or environmental conditions in the operating space may be varied during the course of operation of the given testing robot based on robot instructions of a given request. For example, a human, the given testing robot, and/or another robot may change out one or more (e.g., all) of the environmental objects with other environmental objects that also conform to the environmental parameters. In some of the preceding implementations, variability among environmental objects and/or conditions may also provide diversity in the data generated by the testing robots based on robot instructions and/or robustness in the additional data generated based on that data. For example, a neural network trained based on diverse data generated by the testing robot may provide robustness in a control strategy that uses the neural network in performing one or more robot operations.

The robot instructions provided in a request may take various forms. For example, the instructions may be provided as object code that can be executed directly by one or more processors of each of the testing robots. Also, for example, the instructions may be provided as source code that must first be compiled before being executed by the testing robots. Also, for example, the instructions may be provided as a state machine or other data structure that may be implemented by the testing robots in real-time.

The environmental parameters provided in a request may likewise take various forms. For example, the environmental parameters may specify one or more particular objects to be interacted with by a robot (e.g., a spatula, a cup, a plate, a door with a round knob, a door with a handle) or a class of objects to be interacted with by a robot (e.g., kitchen items, doors). Also, for example, the environmental parameters may specify one or more pose constraints for an initial configuration of the environmental objects (e.g., within a certain area, within a particular container, within a certain range of poses relative to a testing robot). Also, for example, the environmental parameters may specify one or more additional objects in the environment that may not necessarily be directly interacted with by the robot such as surfaces on which interaction objects may rest, background objects, obstacles, etc. Also, for example, environmental parameters may specify one or more environmental conditions such as lighting conditions, temperature conditions, humidity conditions, etc. In some implementations, one or more of the environmental parameters may optionally be configured via a graphical user interface of a first computing device and transmitted to a separate computing device as part of a request.

It will be appreciated that after a given testing robot is operated in accordance with a request, the instructions and/or environmental conditions of the given testing robot may be updated in accordance with another request. The given testing robot may then be operated based on the updated instructions and/or environmental conditions of the other request to generate data for the other request. The methods and apparatus described herein enable the robot instructions of testing robots to be altered over time, and environmental parameters of those testing robots to be altered, to thereby accommodate multiple requests that each contain unique robot instructions and/or unique environmental conditions.

In some implementations, a robot simulator may also be utilized to generate simulated data that may be utilized, for example, to supplement the data generated by the physical robots. For instance, at least some of the simulated data may also be provided in response to a request and/or may be utilized (optionally in combination with the data from the physical robots) to generate additional data that is provided in response to a request. As one example, a simulated operating space of the robot simulator may be configured based on the environmental parameters and the robot simulator operated based on the robot instructions. Simulated sensor data generated by the robot simulator during the operation of the robot simulator based on the robot instructions may be stored—and utilized as described above.

Turning now to the Figures, FIG. 1 illustrates an example environment in which implementations disclosed herein may be implemented. Example robots 180A and 180B are illustrated in FIG. 1. Robots 180A and 180B are "robot arms" having multiple degrees of freedom to enable traversal of grasping end effectors 182A and 182B along any of a plurality of potential paths to position the grasping end effectors 182A and 182B in desired locations. Robots 180A and 180B each further controls the two opposed "claws" of their corresponding grasping end effector 182A, 182B to actuate the claws between at least an open position and a closed position (and/or optionally a plurality of "partially closed" positions).

Example vision sensors 184A and 184B are also illustrated in FIG. 1. In FIG. 1, vision sensor 184A is mounted at a fixed pose relative to the base or other stationary reference point of robot 180A. Vision sensor 184B is also mounted at a fixed pose relative to the base or other stationary reference point of robot 180B. As illustrated in FIG. 1, the pose of the vision senor 184A relative to the robot 180A is different than the pose of the vision sensor 184B relative to the robot 180B. As described herein, in some implementations this difference in poses of the vision sensors 184A and 184B may be beneficial to enable robot instructions to be tested on varied configurations and/or to enable diverse sensor data (e.g., sensor data from the vision sensors) to be generated and stored (e.g., for use in generating diverse training examples and/or for other purposes). Vision sensors 184A and 184B are sensors that can generate images related to shape, color, depth, and/or other features of object(s) that are in the line of sight of the sensors. The vision sensors 184A and 184B may be, for example, monographic cameras, stereographic cameras, and/or 3D laser scanners. A 3D laser scanner includes one or more lasers that emit light and one or more sensors that collect data related to reflections of the emitted light.

The vision sensor 184A has a field of view of at least a portion of the operating space of the robot 180A, such as the portion of the operating space that includes example objects 191A. Although resting surface(s) for objects 191A are not illustrated in FIG. 1, those objects may rest on a table, a tray, and/or other surface(s). Objects 191A include a spatula, a stapler, and a pencil. In other implementations more objects, fewer objects, additional objects, and/or alternative objects may be provided during all or portions of operating robot 180A based on robot instructions received in a request as described herein. The vision sensor 184B has a field of view of at least a portion of the operating space of the robot 1806, such as the portion of the operating space that includes example objects 191B. Although resting surface(s) for objects 191B are not illustrated in FIG. 1, they may rest on a table, a tray, and/or other surface(s). Objects 191B include a pencil, a stapler, and glasses. In other implementations more objects, fewer objects, additional objects, and/or alternative objects may be provided during all or portions of operating robot 1806 based on robot instructions received in a request as described herein.

Although particular robots 180A and 1806 are illustrated in FIG. 1, additional and/or alternative robots may be utilized, including additional robot arms that are similar to robots 180A and 1806, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision sensors 184A and 184B are illustrated in FIG. 1, additional and/or alternative mountings may be utilized. For example, in some implementations vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be operated based on robot instructions received in a request and/or in an operating space configured based on environmental parameters received in a request—and data generated by sensor(s) and/or other components of the robots during the operation may be stored and utilized for various purposes. For example, robot 180A, robot 180B, and additional robots may be operated in parallel for a first time period based on robot instructions received in a first request, data generated during the operation stored, and at least some of the stored data and/or additional data generated based on the stored data provided in response to the first request. Further, robot 180A, robot 180B, and additional robots may be operated in parallel for a second time period based on robot instructions received in a second request, data generated during the operation stored, and at least some of the stored data and/or additional data generated based on the stored data provided in response to the second request.

System 110 performs, and/or facilitates performance of, various techniques disclosed herein. In some implementations, all or aspects of system 110 may be implemented on robot 180A and/or robot 180B (e.g., via one or more processors of robots 180A and 180B). For example, robots 180A and 180B may each include an instance of the system 110. In some implementations, all or aspects of system 110 may be implemented on one or more computing devices that are separate from, but in network communication with, robots 180A and 180B. In some implementations, system 110 may share one or more aspects in common with computing device 710 of FIG. 7.

Figure 2:
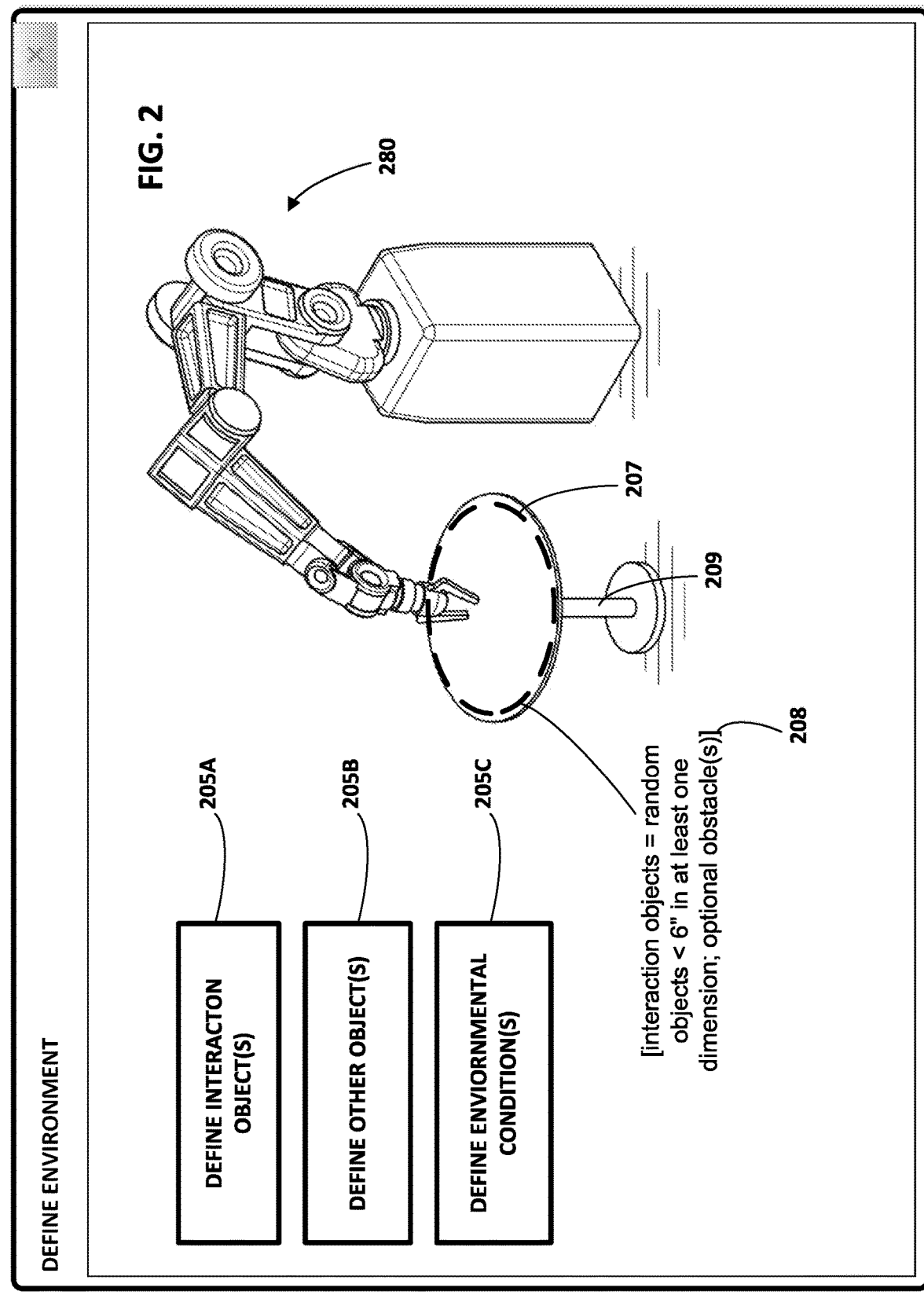
FIG. 2 illustrates an example graphical interface that may be utilized to define environmental parameters for the operation of testing robots according to some implementations disclosed herein.

In the example of FIG. 1, system 110 includes a request engine 112 and a robot data engine 114. The request engine 112 receives and processes requests received from one or more other computing devices, such as client computing devices 120. For example, one of the client computing devices 120 may transmit a request, via one or more network interfaces of the client computing device 120, that is received by the system 110 via one or more network interfaces of the system 110. The request may optionally be transmitted to the system 110 via one or more networks such as a wide area network (e.g., the Internet). In some implementations, a user of one of the client computing devices 120 may formulate all or portions of the request via one of the client computing devices 120 and the request may be transmitted by the client computing device 120 in response to user interface input initiated by the user at the client computing device 120. One example of a graphical user interface that may be utilized to formulate a portion of a request via one of the client computing devices 120 is illustrated in FIG. 2 and described in more detail below.

A request received by request engine 112 may include robot instructions, environmental parameters, a machine learning model (and/or properties of a machine learning model), testing breadth information, testing urgency information, desired data information, and/or other information. In some implementations, multiple (e.g., all) components of a request are included in a single transmission to the system 110. In some other implementations, multiple components of a request are transmitted to the system 110 in separate transmissions. For example, robot instructions of a given request may be provided in a first transmission at a first time and environmental parameters of the given request provided in a separate second transmission at a second time. Although client computing devices 120 are illustrated as laptops in FIG. 1, it is understood that additional and/or alternative computing devices may be provided, such as tablets, smart phones, desktop computers, etc.

When a request includes robot instructions, the request engine 112 causes multiple testing robots (e.g., robots 180A, 180B, and/or additional robots) to be operated based on the robot instructions. In some implementations, the request engine 112 may load the robot instructions (or a compilation of the robot instructions) in memory or other computer readable media of each of multiple testing robots to cause those testing robots to be operated based on the robot instructions. In some implementations, the robot instructions provided in a request will operate on a robot along with other robot instructions of the robot, such as other robot instructions that control functionality of the robot that is in addition to the functionality controlled by the robot instructions of the request. For example, the robot instructions may be instructions that determine, based on sensor data generated by sensors associated with a robot, the trajectory of a grasping end effector of the robot in effectuating grasp attempts. Those robot instructions may rely on sensor data generated by one or more sensors of the robot based on other robot instructions and may rely on other robot instructions that translate the trajectory of the grasping end effector into low level control commands provided to actuators (e.g., servo motors) of the robot to effectuate the trajectory.

The robot instructions provided in a request may take various forms. For example, the robot instructions may be provided as object code that can be executed directly by one or more processors of each of the testing robots. In some of those implementations, the request engine 112 may load the object code robot instructions directly to each of multiple robots. Also, for example, the instructions may be provided as source code that must first be compiled before being executed by the testing robots. In some of those implementations, the request engine 112 may compile the robot instructions and load the compilation of the robot instructions to each of multiple robots. Also, for example, the instructions may be provided as a state machine or other data structure that may be implemented by the testing robots in real-time. In some of those implementations, the request engine 112 may load the state machine or other data structure to each of multiple robots and those robots may convert those data structures to object code or other form during operation of the robots based on the robot instructions.

When a request includes environmental parameters, the request engine 112 provides commands to the testing robots, other robots, other systems, and/or humans to cause the operating space, of each of multiple testing robots to be utilized in response to the request, to be configured based on the environmental parameters. For example, commands may be provided to other robots to cause those robots to configure the operating space of a testing robot based on environmental parameters in advance of testing performed by the robot based on the request. Also, for example, the request engine 112 may generate user interface output to display to one or more humans in advance of testing based on the request. The user interface output may provide information regarding the environmental parameters and optionally dictates the testing robots that are going to be used for the request and whose operating space is to be configured based on the environmental parameters.

The environmental parameters provided in a request may take various forms. For example, the environmental parameters may specify one or more particular objects to be interacted with by a robot (e.g., a spatula, a cup, a plate, a door with a round knob, a door with a handle) and/or a class of objects to be interacted with by a robot (e.g., kitchen items, doors). Also, for example, the environmental parameters may specify one or more pose constraints for an initial configuration of the environmental objects (e.g., within a certain area, within a particular container, within a certain range of poses relative to a testing robot). Also, for example, the environmental parameters may specify one or more additional objects in the environment that may not necessarily be directly interacted with by the robot such as surfaces on which interaction objects may rest, barriers that may constrain the objects to a certain area, background objects, obstacles, etc. Also, for example, environmental parameters may specify one or more environmental conditions such as lighting conditions, temperature conditions, humidity conditions, etc. In some implementations, one or more of the environmental parameters may optionally be configured via a graphical user interface of one of the client computing devices 120. One example of this is described in more detail below with respect to FIG. 2.

In some implementations, a request includes a machine learning model such as a neural network model. In some of those implementations, the machine learning model is to be utilized in operating testing robots based on the request. For example, the robot instructions may include instructions for utilizing a neural network model in the operation of the testing robots. For instance, the robot instructions may define the input parameters of the model and how the output of the model is utilized to control the operation of the testing robots. As one particular example, a neural network model may be utilized in determining a pre-grasp pose based on sensor data from a vision sensor, and the robot instructions may dictate the parameters of the sensor data that is to be applied as input to the model. The robot instructions may further dictate how output generated over the neural network model is to be utilized to determine the pre-grasp pose, how to traverse the end effector to a determined pre-grasp pose, and/or how to attempt a grasp after the pre-grasp pose is reached. In implementations where the machine learning model is to be utilized in operating testing robots based on the request, the request engine 112 causes the multiple testing robots to be operated based on the machine learning model. For example, the request engine 112 may load the neural network model in memory or other computer readable media of each of multiple testing robots, along with the robot instructions, to cause one or more processors of those testing robots to operate the robots based on the robot instructions and the neural network model.

In some implementations where the request includes a machine learning model and/or properties of the machine learning model, the request engine 112 may provide the neural network model to the robot data engine 114 to enable the robot data engine 114 to generate additional data based on the machine learning model. For example, and as described in more detail herein, the additional data may include training examples for training of a neural network model and/or an updated neural network model based on training the neural network model based on the training examples.

The testing breadth information that may be included in a request indicates a quantity of testing robots to utilize in response to the request and/or a duration of testing that occurs in response to a request. When a request includes testing breadth information, the request engine 112 uses the testing breadth information to determine a quantity of testing robots to utilize in response to the request and/or a duration of testing that occurs in response to the request. As one example, the testing breadth information may indicate that testing is to be performed for twenty hours and the request engine 112 may determine ten testing robots should be operated based on the request for two hours each, or that five testing robots should be operated based on the request for three hours each, and another five for one hour each. As another example, the testing breadth information of a request may particularly specify that testing should occur across five separate robots for a duration of three hours on each—and the request engine 112 may ensure testing occurs that conforms to the particularly specified testing breadth information. The request engine 112 may utilize various techniques to schedule the testing robots to be operated based on a request and may optionally operate one or more testing robots for a given request in parallel during at least some of the testing based on the request.

The testing urgency information that may be included in a request indicates a time by which data generated based on the testing is expected to be received. The request engine 112 may use the testing urgency information to schedule the testing robots to be operated based on a request. For example, more urgent requests may be scheduled before less urgent requests. The request engine 112 may also take into account other factors in scheduling testing robots, such as the testing breadth information and/or time required in generating data to be provided in response to the testing. For example, where data generated by the testing robots is to be provide in response to the request without any additional data that is generated based on that data, data can be provided in response to the request relatively quickly. However, where additional data is to be generated that includes an updated neural network model that is updated based on training the model in view of training examples generated based on data generated by testing robots during testing, that additional data may require a relatively greater amount of time to generate.

The desired data information that may be included in a request indicates the data that is desired in response to a request. For example, the desired data may indicate which data (if any) generated by testing robots during operation based on the request should be provided in response to the request and/or which additional data (if any) should be generated based on data generated by the testing robots, and provided in response to the request. The request engine 112 may provide the desired data information to the robot data engine 114 to enable the robot data engine 114 to determine and provide desired data in response to a request.

Data is generated by testing robots during operation of the testing robots based on a request. The generated data may include, for example, sensor data from one or more sensors of the robot. For example, the senor data may include video/images from vision sensors, force measures from force sensors, position measures from position sensors, measures from tactile sensors. The generated data may additionally or alternatively include data that indicates error condition(s) encountered during operation of the robot. For example, the data that indicates error conditions may include data generated in response to erroneous robot instructions (e.g., instructions that cause one or more processors of a robot to generate an error when the processor(s) attempt execution of those instructions), data generated in response to robot instructions that cause operational and/or safety limits to be exceeded, etc. At least some of (e.g., all of) the generated data may be stored in association with the request in database 117. The database 117 includes one or more non-transitory computer readable media that are local to one or more of the testing robots and/or remote from one or more of the testing robots. In some implementations, the database 117 may be remote from the testing robots and each of the testing robots may store generated data locally and transmit the data (continuously, periodically, or at other regular or non-regular interval) to the database 117.

In some implementations, the robot data engine 114 provides, in response to a request, at least some of the data generated by the testing robots during operation based on the request. For example, the robot data engine 114 may transmit the data to the client computing device 120 that submitted the request, to one or more additional client computing devices 120, and/or to another component (e.g., to a separate database). In some implementations, which data is provided in response to a request may be based on the robot data information included in the request. For example, the robot data information of a given request may indicate that video captured by vision sensors associated with testing robots be provided and that any generated error conditions be provided. In implementations where the stored data is provided in response to the request, it may be utilized for various purposes such as analysis of performance of the robot instructions, modification of the robot instructions, and/or to generate training examples for training of a neural network model or other machine learning model.

In some implementations, the robot data engine 114 provides, in response to a request, at least some additional data that is generated based on the data generated by the testing robots during operation based on the request. The additional data may be provided in addition to, or instead of, the data generated by the robots during the operation based on the request. In implementations where additional data generated based on the stored data is provided in response to the request, various types of additional data may be provided. For example, the robot data engine 114 may perform an analysis of the robot instructions based on the stored data and provide the results of the analysis as the additional data. For instance, the success rate of a door opening task implemented by robot instructions may be determined based on force sensor readings preceding and/or following door opening attempts, readings from sensors on doors that are being interacted with, and/or analysis of images before and/or after door opening attempts. Also, for example, the robot data engine 114 may modify the robot instructions based on the stored data and provide the modified robot instructions as the additional data. Also, for example, the robot data engine 114 may generate training examples based on the stored data and in view of a neural network model and/or neural network model properties provide with a request, and provide the training examples as the additional data.

As yet another example, the robot instructions may be provided with a neural network model, the robot data engine 114 may generate training examples based on the stored data and the neural network model, the robot data engine 114 (or a separate engine) may train the neural network model based on the training examples, and the additional data may include the neural network model as updated based on the training. For instance, the robot instructions may include instructions for utilizing the trained neural network model in the operation of the testing robots (e.g., instructions that define the input parameters of the model and how the output of the model is utilized to control the operation of the testing robots)—and data from operating the testing robots based on the neural network model used to generate training examples to update the neural network model. Also, for instance, the robot instructions may include instructions for operating the robot to generate training examples for the model, without utilization of the model, and data from operating the robot based on the robot instructions may be used to initially train and/or update the neural network model.

Robot simulator 130 is also illustrated in the environment of FIG. 1. Robot simulator 130 may be implemented on one or more computing devices that are optionally in addition to any computing device on which the system 110 operates. In some implementations, the request engine 112 may cause the robot simulator 130 to operate based on a request and the robot simulator 130 may generate simulated data during the operation base on the request. For example, the request engine 112 may cause the robot simulator 130 to operate based on the robot instructions and/or environmental parameters of a request. For instance, a simulated operating space of the robot simulator 130 may be configured based on the environmental parameters and the robot simulator 130 may execute the robot instructions or a compilation of the robot instructions.

The simulated data generated by the robot simulator 130 may be utilized to supplement the data generated by the physical testing robots. For example, at least some of the simulated data may also be provided in response to a request and/or may be utilized (optionally in combination with the data from the physical robots) to generate additional data that is provided in response to a request. In some implementations, the simulated data may be utilized to generate training examples for training a neural network model provided with a request. The training based on the simulated data may be an initial training of the model or a subsequent training of the model. In some of those implementations, the neural network model may first be trained based on training examples generated based on the simulated data—and only after such training may the neural network model then be used to operate physical testing robots.

FIG. 2 illustrates an example graphical interface that may be utilized to define environmental parameters for the operation of testing robots according to some implementations disclosed herein. The graphical interface may be graphically represented on a display of one of the client computing devices 120 and a user may interact with the graphical interface via one or more user interface input devices of the computing device.

The graphical interface includes a robot depiction 280, a table depiction 209, a pose constraint depiction 207, interface elements 205A-C, and text 208. The table depiction 209 represents a table that may be present in the operating space of a physical robot, but with which the robot may not directly interact. For example, the robot may not contact the table, or may only incidentally contact the table during manipulation of objects that rest on the table. The pose constraint indicated by pose constraint depiction 207 is a planar bounding area on the surface of the table 209 and defines an area of the surface of the table 209 on which interaction objects can be placed. Interaction objects are environmental objects with which the robot may directly interact (e.g., move, change the configuration of, or otherwise manipulate). The text 208 indicates properties of environmental objects that can be placed on the planar bounding area indicated by the pose constraint depiction 207. In particular, the text 208 indicates that the interaction objects that can be included in the area are "random objects" that are less than six inches in at least one dimension (e.g., to be graspable by a particular grasping end effector). The text 208 further indicates that obstacles that will not be interacted with by the robot may optionally be included in the pose area.

In some implementations, the pose constraint indicated by pose constraint depiction 207 and/or the environmental objects indicated by text 208 may be defined via interaction with interface element 205A. For example, selecting the interface element 205A may provide a drawing tool that enables the user to define the pose constraint indicated by depiction 207 of FIG. 2 and to define the environmental objects with which the robot will interact that are indicated by text 208. In some implementations, the table 209 may be defined by interaction with interface element 205B and environmental conditions (e.g., lighting conditions, temperature conditions) may be defined via interaction with interface element 205C.

Although a particular example is illustrated in FIG. 2, many variations are possible. For example, non-planar pose constraints may be defined, such as a spherical pose constraint. Also, for example, multiple pose constraints and associated object(s) may be defined such as a first pose constraint on a first half of the surface of table 209 that is associated with first object(s) and a second pose constraint on a second half of the table that is associated with second object(s) that differ from the first object(s). As yet another example, certain environmental objects may be "fixed" and not changeable by the user, such as a certain surface on which objects can be placed. Also, for example, three-dimensional models of particular interaction objects and/or other environmental objects may be inserted in the graphical display and pose constraints for those objects optionally defined. For instance, a particular interaction object may be defined with a three-dimensional model and the pose of that three-dimensional model in the graphical interface defined as a pose constraint for that particular interaction object. As yet another example, all environmental constraints may be defined via a graphical interface of a computer aided design (CAD) application. Also, for example, other classes of objects may be defined besides "random objects", such as "household objects", "kitchen objects", "silverware", etc. Also, for example, multiple distinct sets of environmental parameters may be defined for a request such as a first group to be configured for a first group of one or more testing robots and a second group to be configured for a second group of one or more testing robots.

The computing device that renders the graphical interface of FIG. 2 may be in communication with the system 110 and may, in response to certain user interface input, provide environmental conditions defined via the graphical user interface to the request engine 112 of system 110 as part of a request. Further, that same computing device or an additional computing device may be utilized to provide robot instructions, a machine learning model, properties of a machine learning model, testing breadth information, testing urgency information, and/or other information of a request to the system 110. In some implementations, a graphical interface may be provided for defining one or more of those parameters of a request, for uploading robot instructions, etc.

Figure 3:
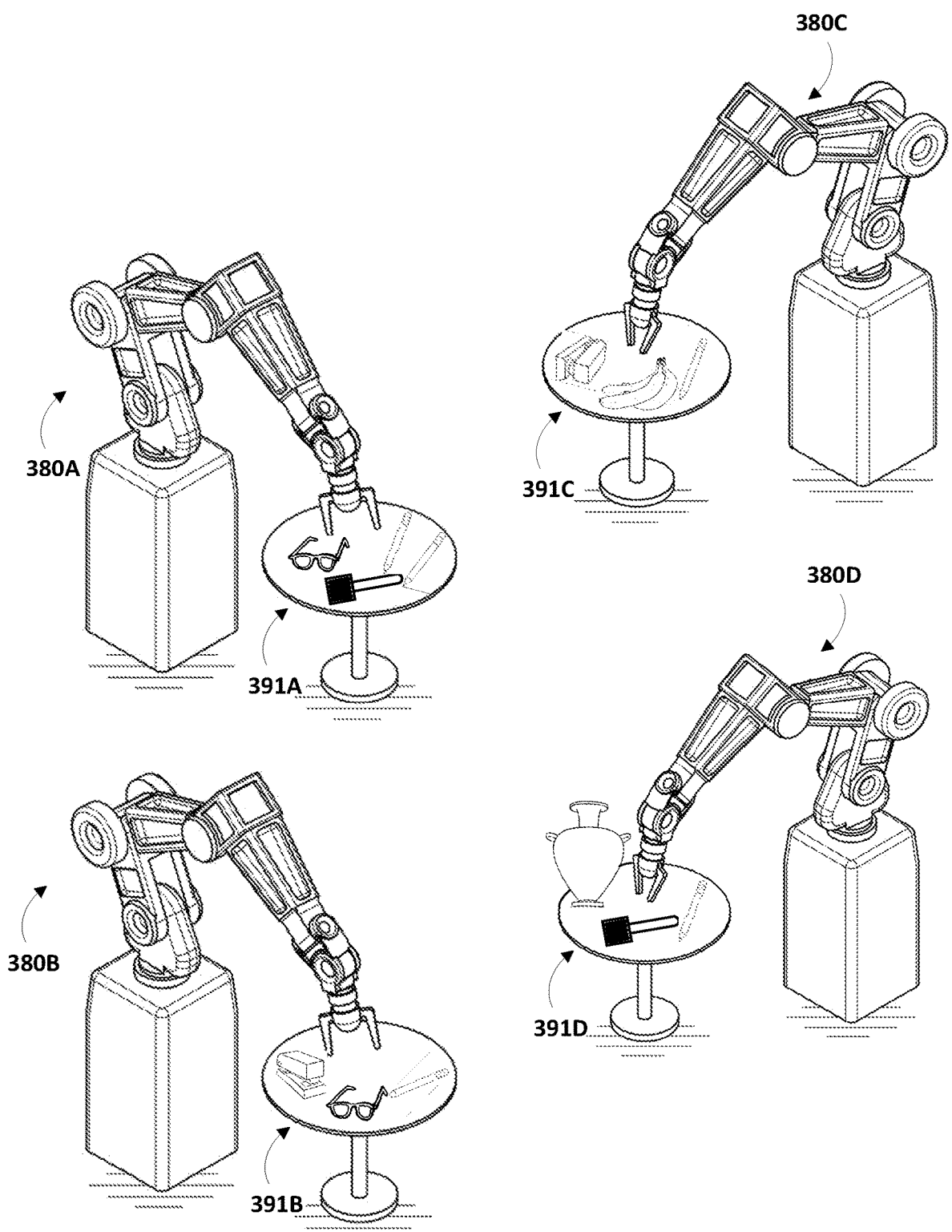
FIG. 3 illustrates multiple testing robots with their operating spaces configured based on defined environmental parameters according to some implementations disclosed herein.

FIG. 3 illustrates multiple testing robots with their operating spaces configured based on the environmental parameters defined via the graphical interface of FIG. 2. The operating spaces may be configured by the robots 380A-D themselves (e.g., by picking up and placing the objects), by other robots, and/or by humans.

Four testing robots 380A-D are illustrated in FIG. 3. More or fewer testing robots may be provided in other implementations. In FIG. 3, the operating space of each of the testing robots 380A-D is configured differently, but is configured in conformance with the environmental parameters defined via the graphical interface of FIG. 2. In particular, objects 391A include interaction objects that all satisfy the pose constraint of FIG. 2, that all conform to the "random object" class, and that all have at least one dimension that is less than six inches. Likewise, objects 391B and 391C include interaction objects that all satisfy the pose constraint of FIG. 2, that all conform to the "random object" class, and that all have at least one dimension that is less than six inches. Objects 391D include interaction objects (the spatula and the pencil) that satisfy the pose constraint, conform to the class, and satisfy the dimension requirement—and also include an object (the vase) that does not conform to the dimension requirement of interaction objects, but instead is an "optional obstacle" that is also in conformance with the environmental parameters defined via the graphical interface of FIG. 2.

It will be appreciated from viewing FIG. 2 that the four groups of objects 391A-D are each placed so that they conform to the environmental parameters, but that the objects and their placements vary in each group. As described herein, this variation in environmental objects may provide diversity in the data generated by the testing robots based on a request and/or diversity and/or robustness in the additional data generated based on that data. Further, in various implementations the environmental objects interacted with by a given testing robot, other objects in the operating space of the given testing robot, and/or environmental conditions in the operating space may be varied during the course of operation of the given testing robot based on the robot instructions of a given request. For example, a human, the given testing robot, and/or another robot may change out one or more (e.g., all) of the environmental objects with other environmental objects that also conform to the environmental parameters.

Figure 4:
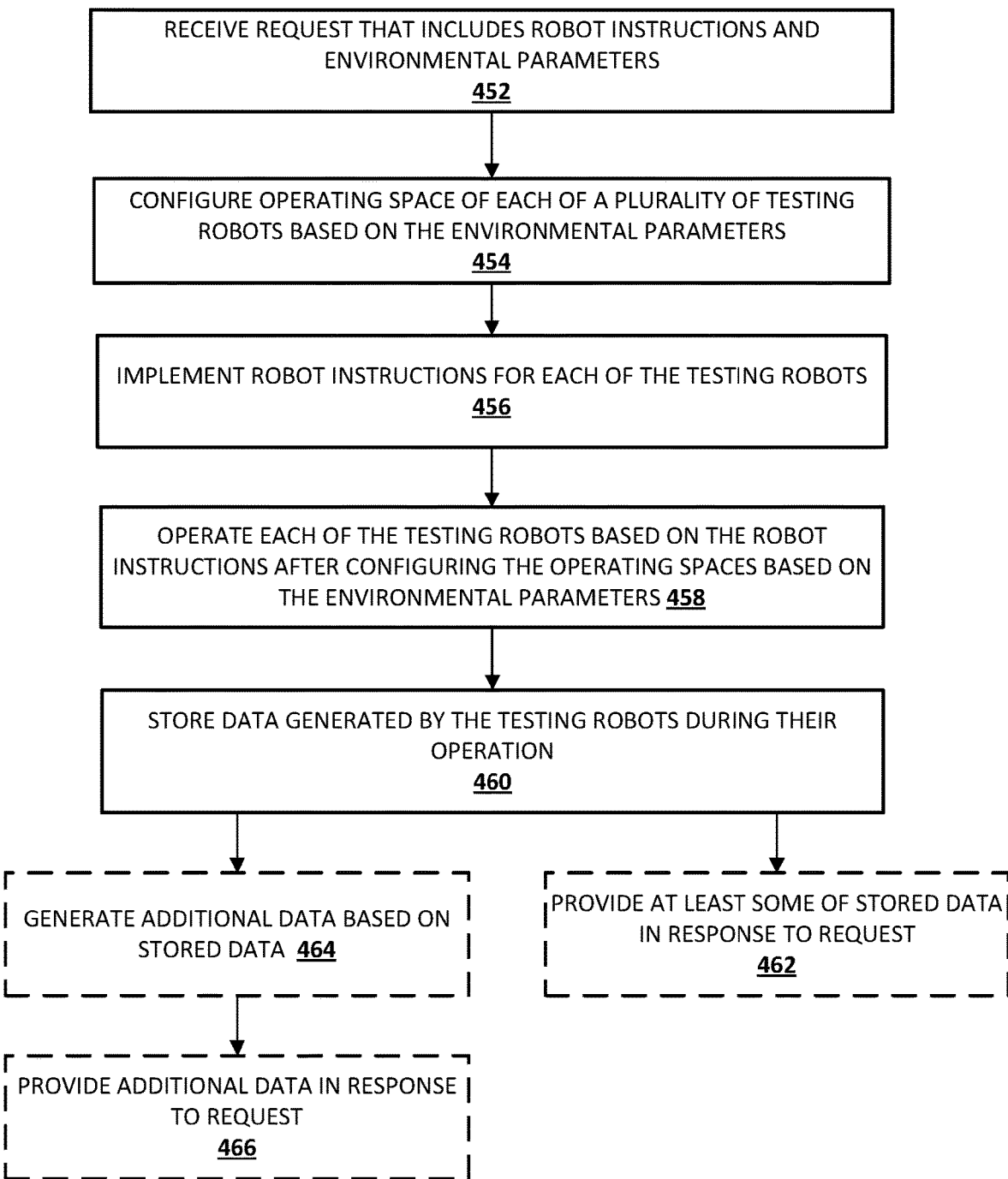
FIG. 4 is a flowchart illustrating an example method of receiving a request that includes robot instructions and environmental parameters; operating each of a plurality of testing robots based on the robot instructions and in an environment configured based on the environmental parameters; storing data generated by the testing robots during the operating; and providing, in response to the request, at least some of the stored data and/or additional data that is generated based on the stored data.

FIG. 4 is a flowchart illustrating an example method 400 of receiving a request that includes robot instructions and environmental parameters; operating each of a plurality of testing robots based on the robot instructions and in an environment configured based on the environmental parameters; storing data generated by the testing robots during the operating; and providing, in response to the request, at least some of the stored data and/or additional data that is generated based on the stored data. For convenience, the operations of the flow chart are described with reference to a system that performs the operations. This system may include one or more components of the system 110 and/or one or more components of a robot, such as a processor and/or robot control system of robot 180A, 180B, 740, and/or other robot. Moreover, while operations of method 400 are shown in a particular order, this is not meant to be limiting. One or more operations may be reordered, omitted or added.

At block 452, the system receives a request that includes robot instructions and environmental parameters. In some implementations, the request may include additional information such as a neural network model, properties of a neural network model, testing breadth information, testing urgency information, and/or desired data information.

At block 454, an operating space of each of a plurality of testing robots is configured based on the environmental parameters. For example, the system may instruct one or more robots to place interaction objects having properties defined by the environmental parameters in the operating space of each of the testing robots. Also, for example, the system may interface with a lighting control system to adjust the lighting in the operating spaces of each of the testing robots based on environmental conditions defined by the environmental parameters and/or may interface with a climate control system to adjust temperature and/or humidity in the operating spaces based on defined environmental conditions. As yet another example, the system may generate user interface output to display to one or more humans in advance of testing based on the request, where the output provides information regarding the environmental parameters and optionally dictates the testing robots that are going to be used for the request. The human(s) may then configure the operating spaces based on the user interface output. In some implementations the testing robots of block 454 may all be located in the same room or in the same building.

In some implementations, each of one or more (e.g., all) operating spaces of the testing robots may be configured differently, but still in conformance with the environmental parameters. In some implementations, a quantity of testing robots that are configured at block 454 may optionally be determined by the system based on testing breadth and/or testing urgency information optionally included in the request of block 452. Also, in some implementations, a time at which one or more of the operating spaces is configured at block 454 may optionally be determined by the system based on testing urgency information optionally included in the request of block 452.

At block 456, the system implements the robot instructions of the request for each of the testing robots. For example, the system may load the robot instructions, or a compilation of the robot instructions, in one or more computer readable media associated with the testing robots for execution by one or more processors of the testing robots. In many implementations, in combination with (e.g., before) loading the robot instructions on a given robot, the system may remove or otherwise disable previously loaded robot instructions from an immediately prior request acted on by the robot.

At block 458, the system operates each of the testing robots based on the robot instructions after configuring the operating spaces based on the environmental parameters. For example, the system may provide one or more commands to the testing robots to cause them to initiate operation based on the robot instructions. In some implementations, one or more of the testing robots may optionally operate based on the robot instructions in parallel for one or more time periods.

At block 460, the system stores data generated by the testing robots during their operation. The generated data may include, for example, sensor data from one or more sensors of the robot and/or data that indicates error condition(s) encountered during operation of the robot.

At block 462, the system optionally provides at least some of the stored data in response to the request of block 452. For example, the system may provide all of the stored data or a subset of the stored data. In some implementations, which stored data is provided may be based on desired data information that is optionally included in the request of block 452.

At block 464, the system optionally generates additional data based on the stored data. The system may generate various types of additional data. For example, the additional data may include training examples generated based on the stored data. For instance, the request of block 452 may include a neural network model, or parameters for the neural network model, and the system may generate training examples based on the model or parameters. For instance, the training examples may be generated with training example input that conforms to input parameters of the neural network model and with training example output that conforms to output parameters of the neural network model.

As another example, in some implementations a neural network model may be provided in a request along with the robot instructions, training examples generated based on the stored data, the neural network model trained based on the training examples, and the additional data may include the neural network model as updated based on the training. In some of those implementations, the neural network model may be utilized in the operation of the testing robots that generated the stored data. In some other of those implementations, the neural network model may not be utilized in the operation of the testing robots that generated the stored data. For example, the robot instructions may be instructions configured to generate desired data for generating training examples to train the model, but the model itself may not be utilized in combination with the instructions.

At block 466, the system optionally provides the additional data in response to the request of block 452. In some implementations, the system performs either blocks 462 or blocks 464 and 466. In some other implementations, the system performs all of blocks 462, 464, and 466. Additional iterations of the method 400 may be performed in response to additional requests.

Figure 5:
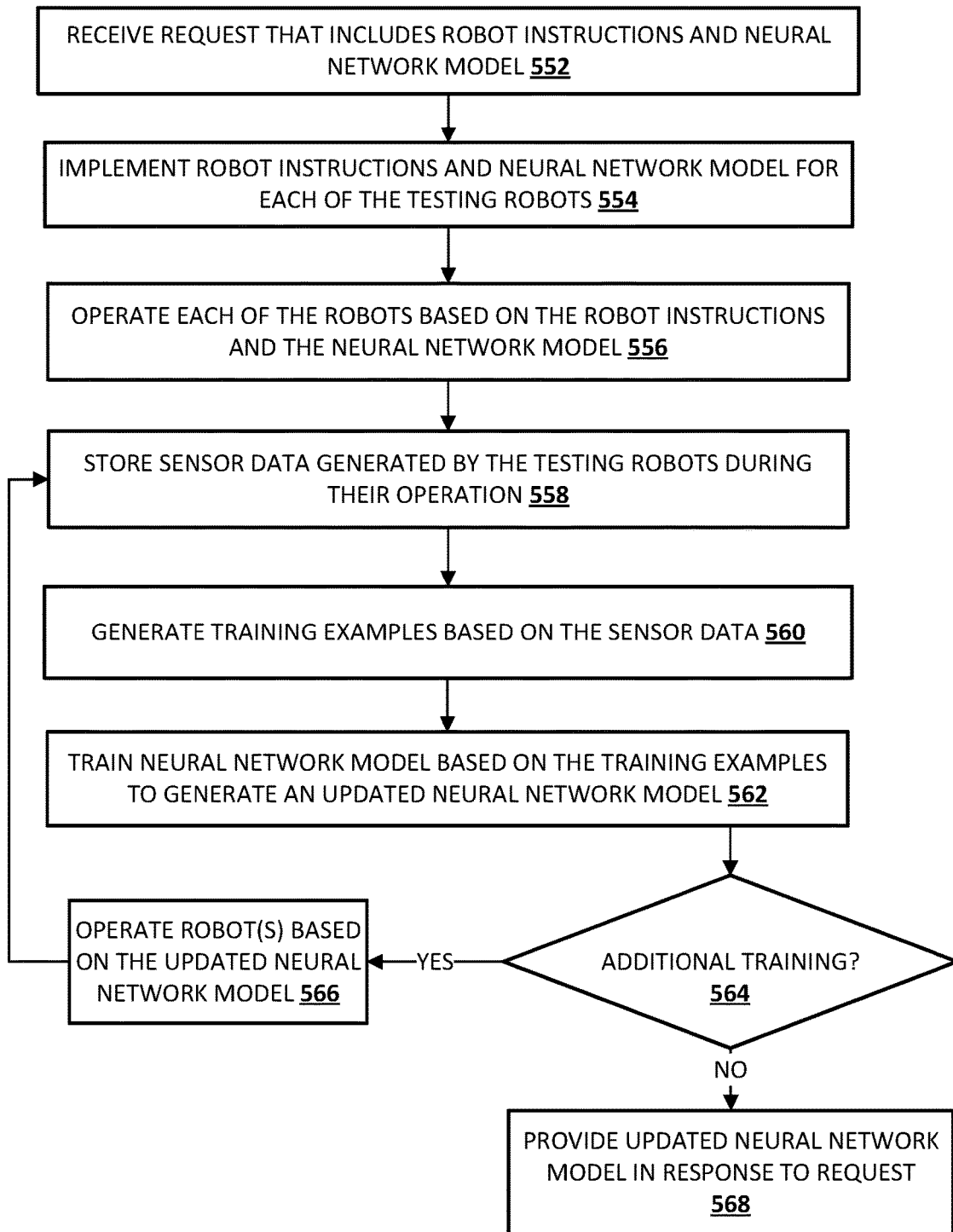
FIG. 5 is a flowchart illustrating an example method of receiving a request that includes robot instructions and a neural network model; operating each of a plurality of testing robots based on the robot instructions and the neural network model; storing data generated by the testing robots during the operating; and providing, in response to the request, additional data that is generated based on the stored data.

FIG. 5 is a flowchart illustrating an example method of receiving a request that includes robot instructions and a neural network model; operating each of a plurality of testing robots based on the robot instructions and the neural network model; storing data generated by the testing robots during the operating; and providing, in response to the request, additional data that is generated based on the stored data. For convenience, the operations of the flow chart are described with reference to a system that performs the operations. This system may include one or more components of the system 110 and/or one or more components of a robot, such as a processor and/or robot control system of robot 180A, 1806, 740, and/or other robot. Moreover, while operations of method 500 are shown in a particular order, this is not meant to be limiting. One or more operations may be reordered, omitted or added.

At block 552, the system receives a request that includes robot instructions and a neural network model. In some implementations, the request may include additional information such as environmental parameters, testing breadth information, testing urgency information, and/or desired data information. In some implementations the robot instructions may include, inter alio, instructions for utilizing the neural network model in the operation of the testing robots. For example, the robot instructions may include instructions that define the input parameters of the model and how the output of the model is utilized to control the operation of the testing robots.

At block 554, the system implements the robot instructions and the neural network model of the request for each of the testing robots. For example, the system may load the robot instructions (or a compilation thereof) and the neural network model in one or more computer readable media associated with the testing robots for execution by one or more processors of the testing robots.

At block 556, the system operates each of the testing robots based on the robot instructions and the neural network model. For example, the system may provide one or more commands to the testing robots to cause them to initiate operation. In some implementations where the request of block 552 also includes environmental parameters, the operating spaces of the testing robots may be configured based on those parameters in advance of operating the respective testing robots based on the robot instructions and the neural network model.

At block 558, the system stores sensor data generated by the testing robots during their operation.

At block 560, the system generates training examples based on the stored sensor data. The training examples may be generated with training example input that conforms to input parameters of the neural network model and with training example output that conforms to output parameters of the neural network model. As one example, the neural network model may be configured to enable: applying, as input to the model, one or more images captured by a vision sensor of a robot; and generating over the model based on the input, an indication of a pre-grasp pose that will enable grasping of an object in one or more of the images. In such an example, training examples may be generated with training example input that includes (optionally processed) stored images from a vision sensor captured prior to a respective grasp attempt and with training example output that indicates the grasp pose of the end effector prior to the respective grasp attempt (e.g., based on position data from positions sensors that control the grasp pose). The training examples may further be labeled as positive or negative training examples (or negative training examples excluded) based on stored data that indicates whether the respective grasp attempt was successful, such as torque sensor readings from a torque sensor of the end effector following the grasp attempt.

At block 562, the system trains the neural network based on the training examples to generate an updated neural network model. For example, the system may, for each of a plurality of training examples, apply the training example input of a training example to the neural network model and perform backpropagation on the neural network model based on the output of the training example.

At block 564, the system determines whether additional training of the neural network model is needed. In some implementations, the system may determine whether additional training of the neural network model is needed based on testing breadth information included in the request of block 552, based on performance of the neural network model, and/or based on other criteria.

If the system determines that additional training is needed, the system proceeds to block 566 where the system operates one or more robots (the same robots as before and/or different robots) based on the robot instructions and the updated neural network model. The system then proceeds back to blocks 558, 560, 562, and 564.

If the system determines at block 564 that additional training is not needed, the system proceeds to block 568 where the system provides the updated neural network model in response to the request of block 552. Additional iterations of the method 500 may be performed in response to additional requests.

Figure 6:
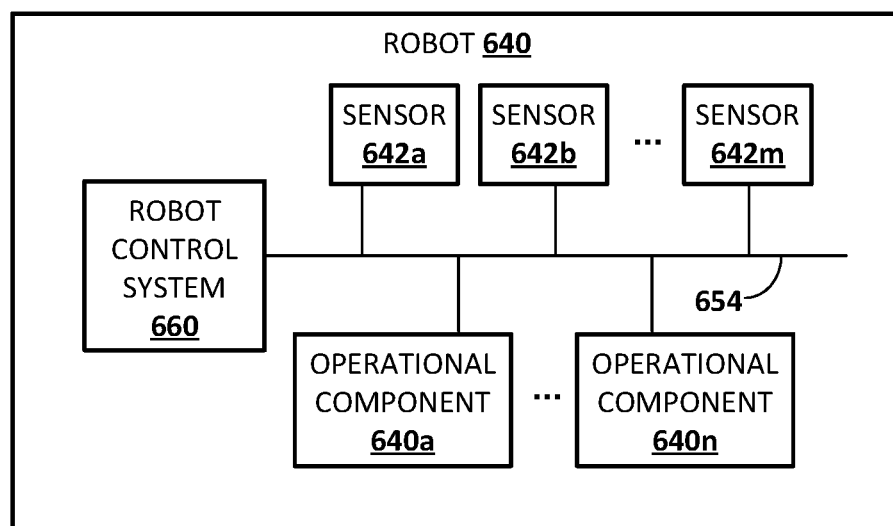
FIG. 6 schematically depicts an example architecture of a robot.

FIG. 6 schematically depicts an example architecture of a robot 640. The robot 640 includes a robot control system 660, one or more operational components 640a-640n, and one or more sensors 642a-642m. The sensors 642a-642m may include, for example, vision sensors, light sensors, pressure sensors, pressure wave sensors (e.g., microphones), proximity sensors, accelerometers, gyroscopes, thermometers, barometers, and so forth. While sensors 642a-m are depicted as being integral with robot 620, this is not meant to be limiting. In some implementations, sensors 642a-m may be located external to robot 620, e.g., as standalone units.

Operational components 640a-640n may include, for example, one or more end effectors and/or one or more servo motors or other actuators to effectuate movement of one or more components of the robot. For example, the robot 620 may have multiple degrees of freedom and each of the actuators may control actuation of the robot 620 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator.

Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 640*a-n*, with each of the real time bursts comprising a set of one or more control commands that dictate, inter alia, the parameters of motion (if any) for each of one or more of the operational components 640*a-n*. In some implementations, the robot control system 660 may perform one or more aspects of methods 400 and/or 500 described herein.

As described herein, in some implementations all or aspects of the control commands generated by control system 660 during a given time period may be based on robot instructions of a request that is being processed by the robot 640 at that time period. For example, the control system 660 may generate control commands based on robot instructions of an active request, or a compilation of those robot instructions. Although control system 660 is illustrated in FIG. 6 as an integral part of the robot 620, in some implementations, all or aspects of the control system 660 may be implemented in a component that is separate from, but in communication with, robot 620. For example, all or aspects of control system 660 may be implemented on one or more computing devices that are in wired and/or wireless communication with the robot 620, such as computing device 710.

Figure 7:
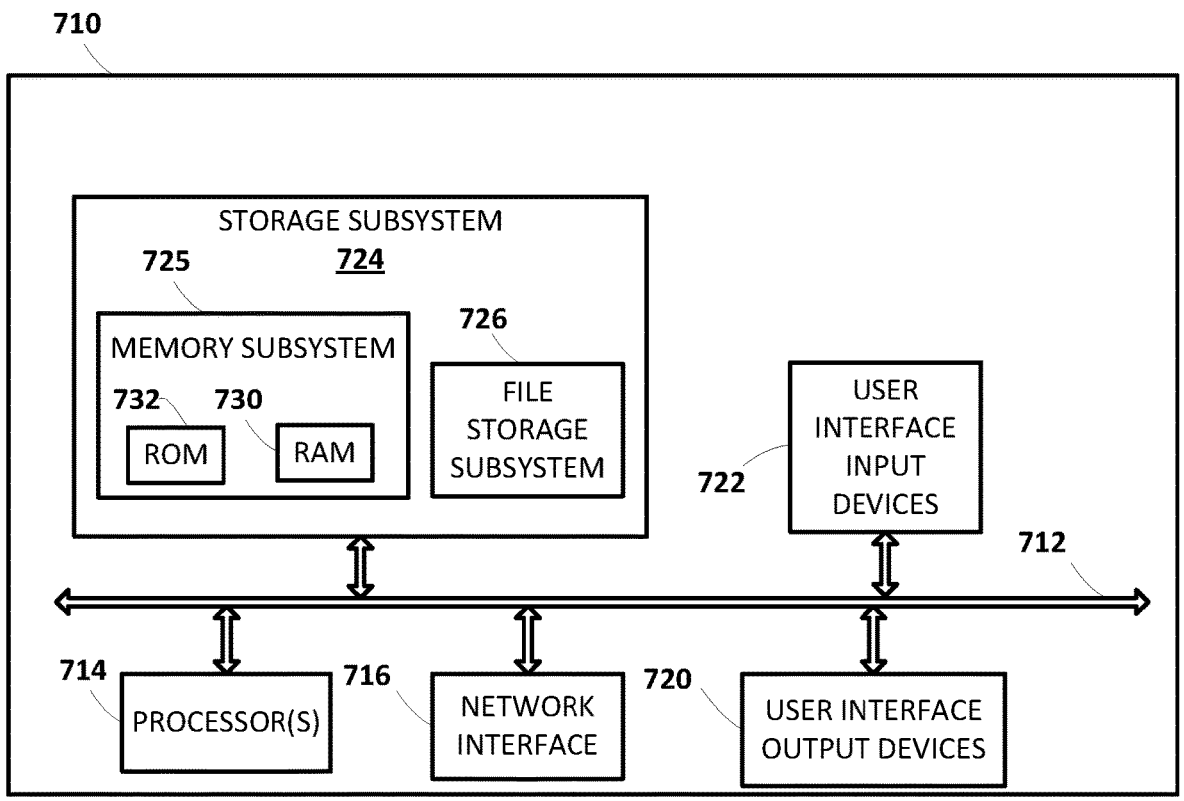
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 4 and/or 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving, via one or more network interfaces, a request that includes environmental parameters and machine learning model properties;
  wherein the machine learning model properties specify a machine learning model to be utilized in operation of a robot, and
  wherein the environmental parameters indicate properties of environmental objects that are external to the robot and that are to be interacted with by the robot during operation of the robot based on the machine learning model;
based on receiving the request:
  configuring a simulated operating space of a robot simulator based on the environmental parameters of the request so that the simulated operating space includes at least one simulated object having at least one of the properties of the environmental parameters, wherein the robot simulator is implemented on one or more computing devices;
  causing the robot simulator to operate based on the machine learning model and with the simulated operating space that is configured based on the environmental parameters;
  training the machine learning model, based on simulated data, to generate an updated machine learning model, wherein the simulated data is generated by the robot simulator during the operation of the robot simulator based on the machine learning model and with the simulated operating space that is configured based on the environmental parameters; and
  providing, via one or more of the network interfaces, the updated machine learning model.

2. The method of claim 1, wherein the properties indicated by the environmental parameters include one or more pose constraints for the environmental objects and wherein configuring the simulated operating space of the robot simulator based on the environmental parameters comprises:
  positioning the simulated object in the simulated operating space based on at least one of the pose constraints.

3. The method of claim 1, wherein the properties indicated by the environmental parameters include a class having a plurality of the environmental objects as members and wherein configuring the simulated operating space of the robot simulator based on the environmental parameters comprises:
  selecting the simulated object based on the simulated object being a member of the class.

4. The method of claim 1, wherein training the machine learning model, based on the simulated data, to generate the updated machine learning model, comprises performing backpropagation on the machine learning model based on training example output generated based on the simulated data.

5. The method of claim 1, wherein the machine learning model is a neural network model.

6. A method, comprising:
receiving user interface input generated via a user interface input device of a client computing device;
generating, based on the user interface input, a request that includes robot instructions, properties of a machine learning model, and environmental parameters,
  wherein the robot instructions in combination with the properties of the machine learning model specify at least part of operation of the robot, and
  wherein the environmental parameters indicate one or more properties of environmental objects that are external to the robot and that are to be interacted with by the robot during operation of the robot based on the robot instructions;
transmitting the request via one or more network interfaces of the client computing device; and
receiving, by the client computing device or an additional computing device in response to the request:
  an updated machine learning model that conforms to the properties of the request, and that is trained based on simulated data generated by a robot simulator operated based on the robot instructions and the properties of the request and with a simulated operating space configured based on the environmental parameters of the request.

7. The method of claim 6, wherein the properties indicated by the environmental parameters include one or more pose constraints for the environmental objects and wherein the simulated operating space is configured based on at least one of the pose constraints.

8. The method of claim 6, wherein the properties indicated by the environmental parameters include a class having a plurality of the environmental objects as members and wherein the simulated operating space is configured based on the class.

9. The method of claim 6, wherein the robot instructions comprise:
  object code that is executable by the robot simulator, or
  source code, wherein a compilation of the source code is executable by the robot simulator.

10. The method of claim 6, wherein the machine learning model is a neural network model.

11. A method, comprising:
receiving, by one or more processors via one or more network interfaces, a request that includes robot instructions and that specifies a machine learning model,
  wherein the robot instructions in combination with the machine learning model specify at least part of operation of a robot;
operating a robot simulator based on the robot instructions and the machine learning model;
storing, by one or more of the processors in one or more computer readable media, simulated data generated by the robot simulator during operation of the robot simulator based on the robot instructions and the machine learning model;
training the machine learning model based on the simulated data generated by the robot simulator during operation of the robot simulator based on the robot instructions and the machine learning model, wherein training the machine learning model creates an updated machine learning model; and
providing the updated machine learning model in response to the request.

12. The method of claim 11, wherein the request further includes environmental parameters, and further comprising:
  configuring a simulated operating space of the robot simulator based on the environmental parameters of the request.

13. The method of claim 11, wherein the environmental parameters indicate one or more pose constraints for environmental objects simulated in the simulated operating space.

14. The method of claim 11, wherein the environmental parameters indicate a class for environmental objects simulated in the simulated operating space.

15. The method of claim 11, wherein training the machine learning model based on the simulated data generated by the robot simulator comprises performing backpropagation on the machine learning model.

16. The method of claim 15, wherein the machine learning model is a neural network model.

* * * * *